United States Patent [19]

Cataldo et al.

[11] Patent Number: 4,540,388
[45] Date of Patent: Sep. 10, 1985

[54] V-BELT STRUCTURE

[75] Inventors: Roy S. Cataldo, Birmingham; Arlis Hall, Rochester, both of Mich.

[73] Assignee: General Motors Corporation, Detroit, Mich.

[21] Appl. No.: 614,660

[22] Filed: May 29, 1984

[51] Int. Cl.³ ............................................. F16G 5/00
[52] U.S. Cl. .................................... 474/242; 474/201
[58] Field of Search ................ 474/242, 240, 246, 201

[56] References Cited

U.S. PATENT DOCUMENTS 3,949,621  4/1976  Beusink et al. ...................... 474/201
4,386,921  6/1983  Roberts ........................... 474/242 X
4,457,742  7/1984  Hattori et al. .................... 474/242 X

FOREIGN PATENT DOCUMENTS 655173  7/1951  United Kingdom ................ 474/201

Primary Examiner—Stephen J. Novosad
Assistant Examiner—Thuy M. Bui
Attorney, Agent, or Firm—Donald F. Scherer

[57] ABSTRACT

A push-type metal V-belt is formed from a single strip of sheet metal. The strip is formed and folded such that the lateral faces between the converging outer drive edges are tapered to have a reduced thickness at the inner fold. The formed strip also has lateral slots in which, after folding, continuous metal bands are disposed for maintaining the belt in a continuous loop configuration.

2 Claims, 5 Drawing Figures

V-BELT STRUCTURE

This invention relates to metal V-belts and more particularly to push-type metal V-belts.

Prior art V-belts are known to use either a constant thickness folded strip or individual drive blocks in their construction. The V-belts using a constant thickness strip have a large "scrub" distance between the guide or retaining bands and the geometric pitch. This generates relatively large friction losses and limits the smallest diameter at which the belts can operate successfully. To solve this problem, the known prior art utilizes separate drive blocks with tapered faces. This requires individual forming and handling of each drive block, thus increasing cost and manufacturing complexity.

The present invention seeks to reduce the cost and manufacturing complexity while overcoming the high friction losses of the single strip folded V-belt. To accomplish this, the present invention forms a lateral surface, between the drive edges, with a tapered configuration thus providing design control of the pitch line. This permits the pitch line to be very close to the continuous band members thereby reducing relative motion therebetween. The tapered configuration also permits the use of these belts successfully at smaller pulley diameters. The present invention also improves the belt operation by reducing noise since each drive segment is made thinner than when individual drive blocks are used, without detrimental effect on the lateral load capacity of the belt.

It is an object of this invention to provide an improved steel V-belt adapted to operate on a V-grooved pulley wherein the V-belt is formed using a single metal strip which is fan-folded such that the outer fold radius is larger than the inner fold radius and the lateral face of the drive portion of each section of the fan-fold is tapered to have reduced thickness at the inner radius.

It is another object of this invention to provide an improved steel V-belt adapted to operate on a V-grooved pulley wherein the V-belt includes a single metal strip which is formed and fan-folded such that the outer fold radius is larger than the inner fold radius and the lateral face of the drive poriton of each section of the fan-fold is tapered to have reduced thickness at the inner radius and wherein lateral drive slots are formed in the single metal strip which, after folding, supports continuous metal bands disposed in the slots between the outer folds and the pitch diameter of the V-belt and pulley.

These and other objects and advantages of the present invention will be more apparent from the following description and drawings in which.

Figure 1:
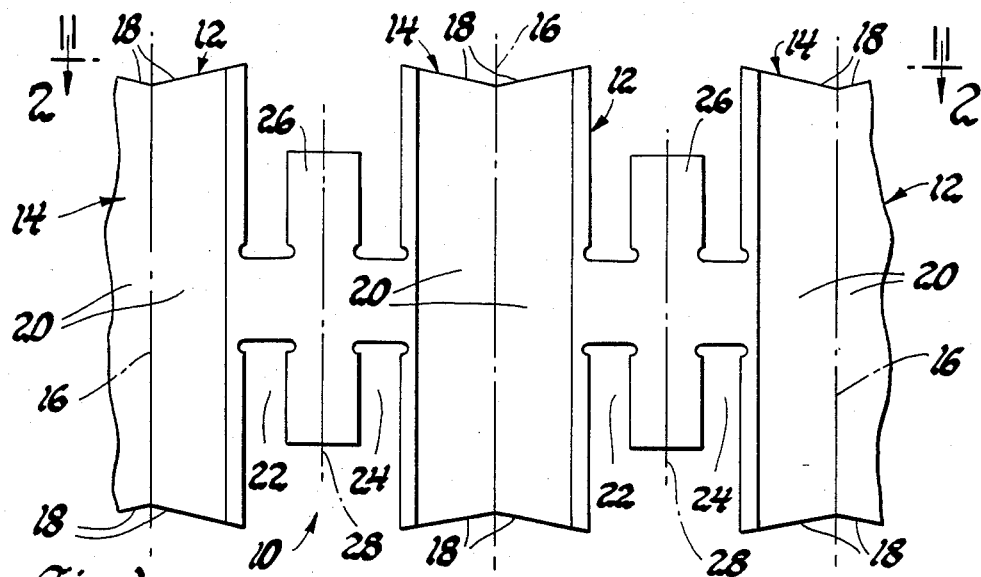
FIG. 1 is a bottom view of a formed metal strip.
Figures 3, 4:
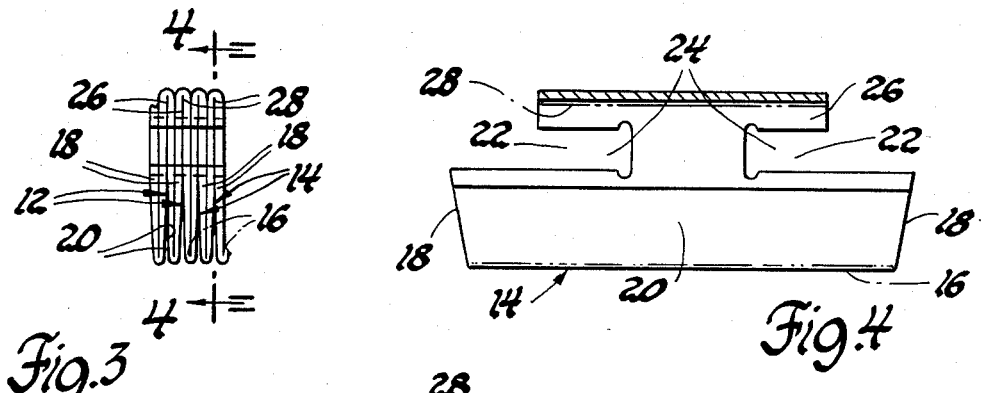
FIG. 3 is a side view of a portion of the metal strip after folding.
FIG. 4 is a view taken along 4—4 of FIG. 3.

Referring to the drawings, wherein like characters represent the same or corresponding parts throughout the several views, there is seen in FIG. 1 a metal strip, generally designated 10, which is formed such that upon folding the configuration shown in FIGS. 3 and 4 will be achieved. The metal strip 10 has adjacent drive portions 12 and 14 formed on opposite sides of a common fold line 16. The drive portions 12 and 14 have drive edges 18 and lateral faces 20.

Figure 2:
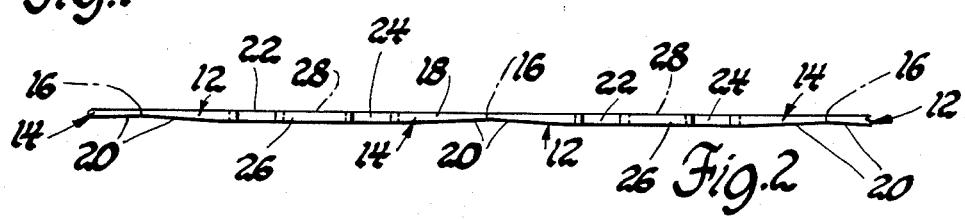
FIG. 2 is a view taken along 2—2 of FIG. 1.
Figure 5:
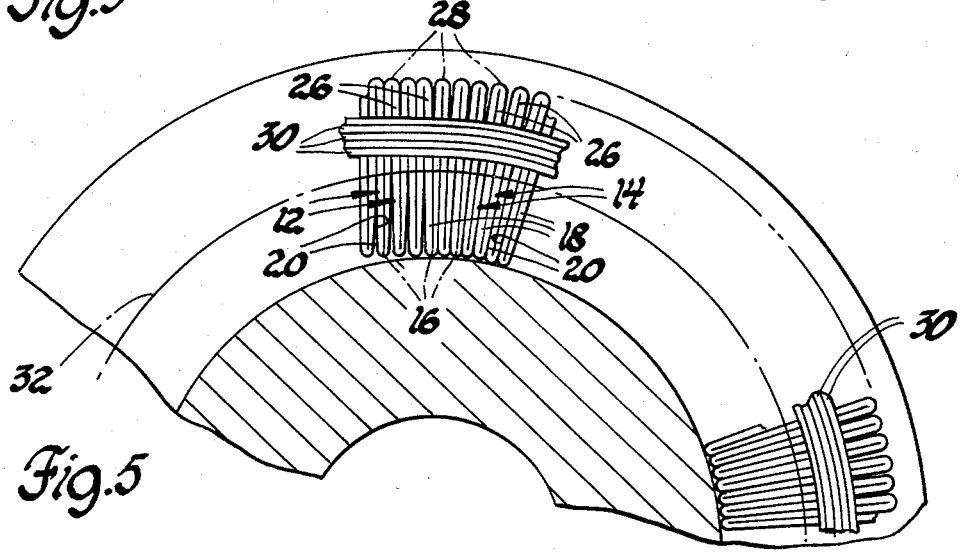
FIG. 5 is a side view of a portion of the V-belt and pulley arrangement.

As seen in FIGS. 2 and 3, the lateral faces 20 are formed with a tapered configuration such that the faces become more narrow as they approach the fold line 16. The drive portions 12 and 14 are formed in pairs along a single metal strip. These pairs of drive portions 12 and 14 are separated by a pair of band slots 22 and 24 and a central bar 26. The central bar 26 has a fold line 28. In the folded configuration, the central bar 26 and the band slots 22 and 24 cooperate to form a T-shaped structure which houses a plurality of continuous metal bands 30, as shown in FIG. 5.

As seen in FIG. 3, the fold line 28 establishes an outer radius fold line and the fold line 16 establishes an inner radius fold line. Also, as seen in FIGS. 3 and 5, the tapered configuration of lateral faces 20 establishes a tapered configuration in the fan-folded metal strip. This tapered configuration will permit the metal drive belt and pulley combination to have a pitch diameter at 32. With the pitch diameter at 32, the "scrub" distance between the pitch diameter 32 and the metal bands 30 is minimal. Likewise, the friction losses are also minimal when the pulley ratio is other than 1:1.

It is well-known that push-type metal V-belts utilizing a continuous metal band such as 30, have a speed differential or scrubbing action between the individual drive portions and the metal bands when the pulley ratio is other than 1:1. Prior to the invention disclosed herein, fan-folded belt configurations had a uniform thickness to each drive portion, thus causing a large scrub distance between the geometric pitch and the metal band or retaining band location since the uniform thickness members tend to pivot about the inner end of the drive face.

The present invention significantly reduces this scrub distance resulting in improved drive belt efficiency.

The embodiments of the invention in which an exclusive property or privilege is claimed are defined as follows:

1. A push-type metal V-belt adapted to operate on V-grooved pulleys and cooperating therewith to establish a pitch diameter comprising; a single metal strip fan-folded to provide outer folded edges, inner folded edges, and drive block portions between said inner and outer folded edges, said inner folded edges being formed with a smaller radius than said outer folded edges so that adjacent drive portions which are connected at an outer folded edge have a tapered configuration from the pitch diameter to the inner folded edge when viewed in a longitudinal section, said drive portions having converging side surfaces when viewed laterally; lateral slots formed in said drive portions between said outer folded edge and the pitch diameter; and continuous metal band members disposed in said lateral slots and being operable to maintain said fan-folded metal strip in a continuous loop when said metal V-belt is operated with the V-grooved pulleys.

2. A push-type metal V-belt adapted to operate on V-grooved pulleys and cooperating therewith to establish a pitch diameter comprising; a single metal strip fan-folded to provide outer folded edges, inner folded edges, drive block portions between said inner and outer folded edges, said inner folded edges being formed with a smaller radius than said outer folded edges, said adjacent drive portions including lateral faces which are connected at an outer folded edge and having a tapered configuration from the pitch diameter to the inner folded edge, said drive portions having converging side surfaces when viewed laterally; lateral slots formed in said drive portions between said outer folded edge and the pitch diameter; and continuous metal band members disposed in said lateral slots and being operable to maintain said fan-folded metal strip in a continuous loop when said metal V-belt is operated with the V-grooved pulleys.

* * * * *